United States Patent [19]
Bernstein

[11] Patent Number: 6,128,301
[45] Date of Patent: *Oct. 3, 2000

[54] ARCHITECTURE FOR DISTRIBUTION OF VOICE OVER ATM NETWORKS

[75] Inventor: Greg M. Bernstein, Fremont, Calif.

[73] Assignee: Nortel Networks Limited, Quebec, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/746,230

[22] Filed: Nov. 7, 1996

[51] Int. Cl.⁷ .................................................. H04L 12/56
[52] U.S. Cl. ...................... 370/396; 370/395; 370/474; 370/477
[58] Field of Search .................................... 370/352, 353, 370/356, 395, 398, 399, 401, 465, 466, 474, 477

[56] References Cited

U.S. PATENT DOCUMENTS

| | | | |
|---|---|---|---|
| 5,293,570 | 3/1994 | Schmidt et al. | 370/352 |
| 5,327,421 | 7/1994 | Hiller et al. . | |
| 5,345,445 | 9/1994 | Hiller et al. . | |
| 5,345,446 | 9/1994 | Hiller et al. . | |
| 5,365,524 | 11/1994 | Hiller et al. . | |
| 5,390,175 | 2/1995 | Hiller et al. . | |
| 5,396,492 | 3/1995 | Lien . | |
| 5,422,882 | 6/1995 | Hiller et al. . | |
| 5,426,636 | 6/1995 | Hiller et al. . | |
| 5,428,607 | 6/1995 | Hiller et al. . | |
| 5,452,297 | 9/1995 | Hiller et al. | 370/352 |
| 5,568,475 | 10/1996 | Doshi et al. | 370/352 |
| 5,751,706 | 5/1998 | Land et al. | 370/352 |
| 5,784,371 | 7/1998 | Iwai | 370/352 |
| 5,809,022 | 9/1998 | Byers et al. | 370/395 |

FOREIGN PATENT DOCUMENTS

| | | |
|---|---|---|
| 0 225 714 | 6/1987 | European Pat. Off. . |
| WO 95/17789 | 6/1995 | WIPO . |

OTHER PUBLICATIONS

Wright, "Voice over ATM: An Evaluation of Implementation Alternatives", May 1996, IEEE Communications Magazine, pp. 72–80.

Wright, "Voice over ATM: An Evaluation of Network Architecture Alternatives", Oct. 1996, IEEE Network, pp. 22–27.

R. Spanke and J. M. Adrian, "ATM Composite Cell Switching for DS0 Digital Switches, " Apr., 1995, XV International Switching Symposium, 269–272, vol. 1.

R. Mauger and S. Brueckheimer, "The Role of ATM in 64 kb/s Switching and Transmission Networks," Apr., 1995, XV International Switching Symposium, pp. 87–91, vol. 2.

*Primary Examiner*—Chi H. Pham
*Assistant Examiner*—Frank Duong
*Attorney, Agent, or Firm*—Finngan, Henderson, Farabow, Garrett & Dunner, L.L.P.

[57] ABSTRACT

A telecommunications network provides efficient switching for voice-over-data lines by having access units coupled to the sources and destinations of telephone calls using virtual channels created in a packet switch to connect to a channel switch that converts incoming packets into the outgoing packets and causes the packet switch to route the outgoing packets to the proper access units.

16 Claims, 7 Drawing Sheets

ARCHITECTURE FOR DISTRIBUTION OF VOICE OVER ATM NETWORKS

I. BACKGROUND OF THE INVENTION

The present invention relates generally to telecommunications systems and, more particularly, to a telecommunications system for carrying voice over packet-switched networks.

Asynchronous Transfer Mode (ATM) represents a standard for transmitting voice, data, and video signals at very high speeds (25 Megabits/second and higher). The increasing deployment of ATM networks, particularly on customer premises, has created a need to provide high quality transport, switching, and call processing of voice communications over a packet network with minimal delay. The delay must not exceed that currently permitted for existing Private Branch Exchanges (PBXs), and the voice quality must be at least as good as such systems to allow a seamless upgrade from present day centralized PBXs to ATM distributed voice services.

Conventional network architectures for carrying voice over ATM have focused on large centralized or distributed voice switching networks. Two such architectures are described in Ron A. Spanke and J. Mark Adrian, "ATM Composite Cell Switching For DS0 Digital Switches," XV International Switching Symposium, pp. 268–272, 1995, and Roy Mauger and Simon Brueckheimer, "The Role of ATM in 64 kb/s Switching and Transmission Networks," XV International Switching Symposium 1995, pp. 87–91. These architectures, however, are designed for large switching systems, such as for central office applications. They suffer when used for distributed voice-over-ATM systems within a customer's premises or campus environment due to blocking limitations, bandwidth inefficiency, and trunking effects.

The main components of such systems are access and switching units and the ATM OFFICES network or switch. The access and switching units provide two functions: (1) switching voice calls from one channel or trunk to another channel or trunk attached to the same unit, and (2) multiplexing voice calls from a channel or trunk into ATM cells to be sent through the ATM network to a channel or trunk attached to a destination access and switching unit. A channel includes any type of voice or communications channel, for example, the H. 320 video at 384 Kbits/sec.

The destination access and switching unit demultiplexes the voice calls onto the appropriate channel or trunk. A channel can be, for example, a DS0 single voice channel, which is a 64 kilobit/second, PCM-encoded digital signal converted from an analog voice signal, and a trunk can be, for example, a T1 or E1 facility, which carries multiple DS0s.

An ATM virtual channel is a packet-switched connection between two points using a logical connection consisting of a set of header and port switching translations at every node through which the ATM cell passes. The voice capacity of an ATM virtual channel depends on the number of DS0 voice channels it can carry, which, in turn, depends on the format used to multiplex voice calls into ATM cells.

The key features of an ATM network carrying voice traffic include: (1) voice channel (DS0) switching capacity, (2) ATM bandwidth efficiency, and (3) equipment cost and utilization. To design such a network, engineers use simplifying assumptions to ensure the network meets the needs for all conditions. For one assumption, all ATM virtual channels in the network have the same DS0 voice channel capacity, all access links carrying virtual channels to the ATM network have the same capacity, and each access link can support the same number of virtual channels.

The worst case routing scenario uses the maximum number of virtual channels while carrying the lowest number of voice channels. With N access and switching units, the worst case scenario occurs when only one channel from an access and switching unit is destined for each of the (N−2) other access and switching units, and all the remaining channels are destined for the (N−1)th access and switching unit. Other routing scenarios can use as many virtual channels as this scenario, but none uses more. This scenario requires that the maximum number of channels, n, that can be accommodated without blocking a single access and switching unit under the worst routing scenario is:

$$n = L_{max} - (T_{min} - 1)(N-2), \qquad (1)$$

where $L_{max}$ is the maximum number of channels that can be carried by the trunking scheme on a given size link and $T_{min}$ is the minimum number of channels carried by a trunking scheme between an access and switching unit and the ATM network.

The maximum network capacity is found by multiplying n (from equation (1)) times the number of access and switching units (N), and optimizing. Thus, the number of access and switching units in the largest capacity system, $N_{large}$, is:

$$N_{large} = 1 + \frac{L_{max}}{2(T_{min} - 1)} \qquad (2)$$

The number of DS0 voice channels supported on an access link in this largest system, $n_{large}$, is:

$$n_{large} = \frac{L_{max}}{2} + (T_{min} - 1). \qquad (3)$$

Equations (1)–(3) assume full mesh connectivity of access and switching units because any call connected to an access and switching unit may be destined for any other access and switching unit.

Equation (1) forces system designers to contend with the fact that the number of voice channels supported at an access and switching unit decreases as the number of access and switching units, N, increases. This causes designers to overengineer access and switching units, which in turn increases equipment and system costs.

As a concrete example, each access link from the access and switching unit to the ATM network could be an STS-3c with $L_{max}=2112$ and $T_{min}=48$. Using these values in equation (2) yields twenty-three access and switching units in the largest possible system. Each access link can support 1103 DS0 voice channels, so the total system capacity is 25,369 DS0 voice channels. A typical PBX system in a distributed environment, on the other hand, may want only 200 channels per distributed location, so a typical twenty-three node network would only require a total system capacity of 4600 DS0 xvoice channels.

Therefore, the conventional architecture does not provide an optimal design for replacing PBX systems with voice-over-ATM networks in a distributed environment. The results cause significant overengineering of access links to support the required connectivity. Therefore, few distributed PBX systems can be created with the conventional voice-over-ATM architecture.

II. SUMMARY OF THE INVENTION

There is a need for a packet switching network architecture to carry voice traffic, such as a voice-over-ATM network, to replace PBX systems with many distributed locations. There is a corresponding need to optimize bandwidth efficiency as well as equipment cost and utilization in a packet switching network carrying voice traffic, such as a voice-over-ATM network, to avoid overengineering the network to provide the required connectivity. There is also a need to provide for tradeoffs between bandwidth efficiency and delay due to packetization of voice calls.

Additional desires and goals will be set forth in part in the following description, and in part will be obvious from the description, or may be learned by practice of the invention. The desires and goals of the invention will be realized and attained by the elements and combinations in the appended claims.

To achieve these goals and in accordance with the purpose of the invention, as embodied and broadly described herein, a telecommunications network according to the present invention for routing telephone calls from sources to destinations includes (1) a multiple of access unit means for (a) converting incoming calls to incoming packets, (b) constructing outgoing calls from outgoing packets, and (c) routing constructed calls to their destinations; (2) a packet switching means having ports for (a) receiving the incoming packets from the access unit means and (b) providing the outgoing packets to the access unit means corresponding to the destinations of the outgoing packets; and (3) a channel switching means, coupled to the packet switching means, for (a) converting the incoming packets to outgoing packets and (b) routing the outgoing packets to the ports of the packet switching means that couple to the destination access unit means.

A method according to this invention for configuring a telecommunications network having access units and channel switching units coupled to a packet switching means includes the steps of determining the required number of channel switching units, N, from the size of the channel switching units, determining the maximum number of channels for each channel switching unit, coupling the access units and the channel switching units to a packet switch, and assigning each access unit to one of the channel switching units.

A method of packing DS0 voice channels into an ATM cell includes the steps of determining a number, M, of DS0 channels, where M is a divisor of 48; placing 48/M samples from each DS0 voice channel into the cell in a contiguous field; and setting an indication in the header of the cell to indicate the packing.

Both the foregoing general description and the following detailed description are exemplary and explanatory only and do not restrict the claimed invention.

III. BRIEF DESCRIPTION OF THE DRAWINGS

The accompanying drawings, which are incorporated in and constitute a part of this specification, illustrate several embodiments of the invention and together with the description serve to explain the principles of the invention. In the drawings.

IV. DESCRIPTION OF THE PREFERRED EMBODIMENTS

Reference will now be made in detail to the preferred implementations of the invention, examples of which are illustrated in the accompanying drawings. Wherever appropriate, the same reference numbers will be used throughout the drawings to refer to the same or like parts.

A. Network Architecture

Figure 1:
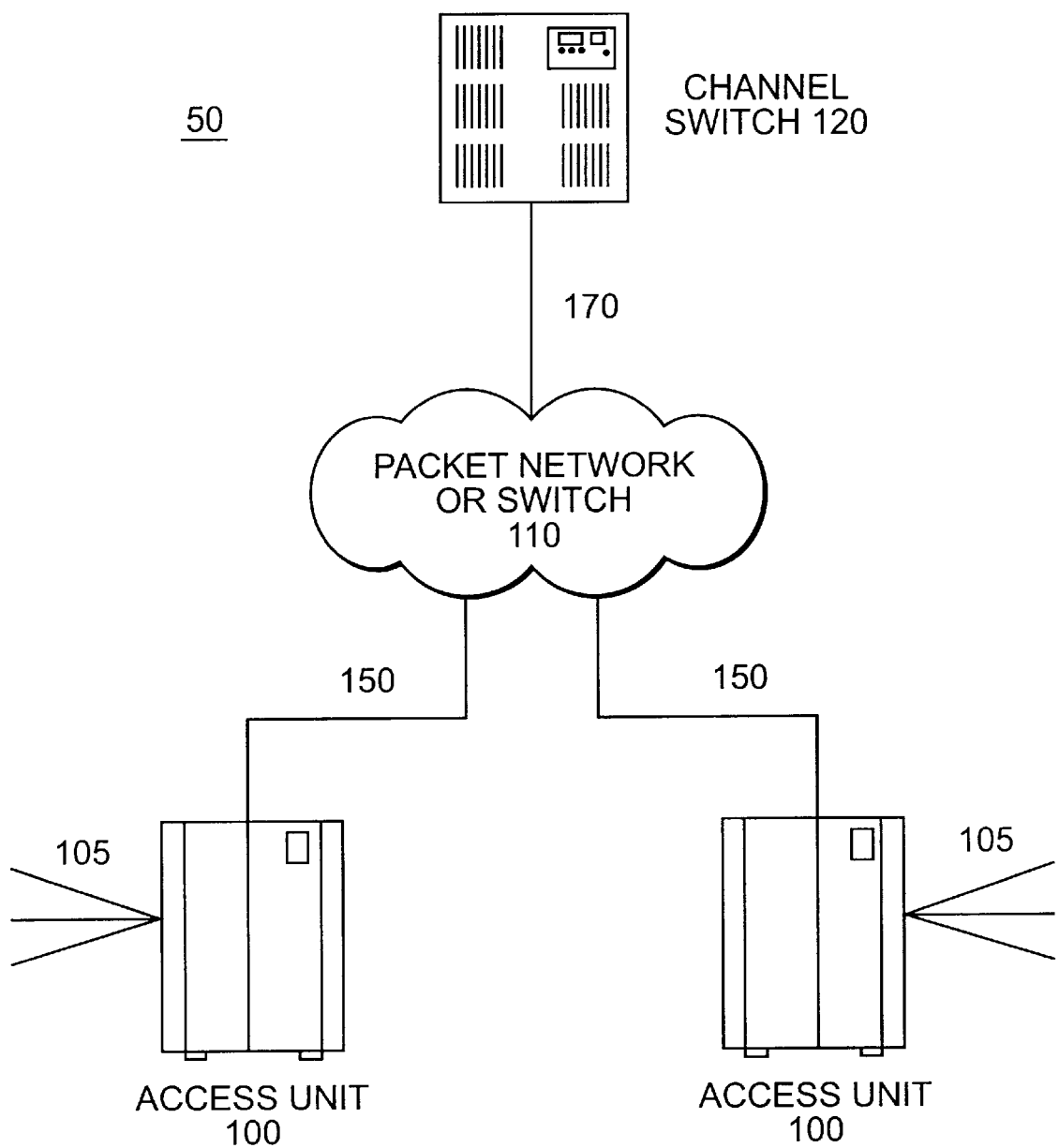
FIG. 1 shows a network consistent with the present invention.

FIG. 1 shows a preferred embodiment of a network 50 consistent with this invention.

Network 50 includes several access units 100, a packet network or switch 110, and a channel switch 120. Unlike conventional systems, the access units 100 in network 50 are separate from channel switch 120 and include only the electronics and control from conventional access and switching units needed to convert incoming calls to packets, reconstruct outgoing calls from packets, and route those calls to their destinations. Each access unit 100 is coupled to packet switch 110.

Voice telephone calls from sources such as handsets or PBXs arrive at access unit 100 via lines or trunks 105. Line 105 may be a channel carrying a single DS0, and trunk 105 may be a T1 or E1 facility.

Access unit 100, which can be part of a modified PBX switch, such as Nortel's Meridian™ switch, adapted to communicate with an ATM network, receives and converts telephone calls into ATM cells. According to the ATM standard, each cell contains fifty-three bytes: forty-eight bytes of payload information and five bytes of header information. Access unit 100 packs the telephone call data into the 48-byte payload field using conventional methods for multiplexing voice DS0s into ATM virtual channels, such as T1/E1 circuit emulation service (CES) based on ATM Adaptation Layer 1 (AAL1), or n×64 kbps multiplexing based on the structured data transfer mode of AAL1. Another multiplexing format is discussed below in more detail.

Access unit 100 also receives outgoing ATM cells from packet switch 110 and determines the destination of the telephone call for each packet based on packet header information. Access unit 100 then converts the packets to the carrier format for the line or trunk 105 corresponding to the destination of the telephone call.

As FIG. 1 shows, packet switching means 110 exchanges packets with access unit 100 over links 150. For ATM cells, link 150 is an ATM 25.6 Mbps link or higher speed link, such as an STS-3c (155.52 Mbps).

Packet switch 110 can be either a single ATM switch, such as the Magellan Passport™ or Magellan Concorde™, or a network of interconnected ATM switches. Link 150 connects to packet switch 110 via a standard ATM interface corresponding to the bandwidth of link 150.

After receiving packets from access unit 100 over link 150, packet switch 110 sends the packets to channel switch 120 via link 170. For ATM cells, link 170 is a high speed ATM link such as an STS-3c (155.52 Mbps). Packet switch 110 creates ATM virtual channels between access unit 100 and channel switch 120 for incoming packets that connect to physical links 150 and 170.

Packet switch 110 also receives outgoing packets from channel switch 120 via link 170, and routes those packets via link 150 via virtual channels to the access unit 100 corresponding to the destination of the call. Virtual channels in switch 110 between channel switch 120 and access unit 100 also route the outgoing packets from channel switch 120 to access unit 100.

Network 50 operates more efficiently than conventional voice-over-ATM architecture because the functionality provided by channel switch 120 has been removed from access units 100 and placed at a single point in the network instead of being distributed throughout the network. Access links 150 therefore do not need the excess bandwidth that the conventional architecture uses to accommodate the full mesh connectivity of channel switching capability. As a result, network 50 avoids the overengineering problem of the conventional architecture.

Furthermore, the number of access units 100 is not limited as in the conventional architecture. Therefore, network 50 can create a distributed PBX architecture with many more distributed locations than can the conventional architecture.

Figure 2:
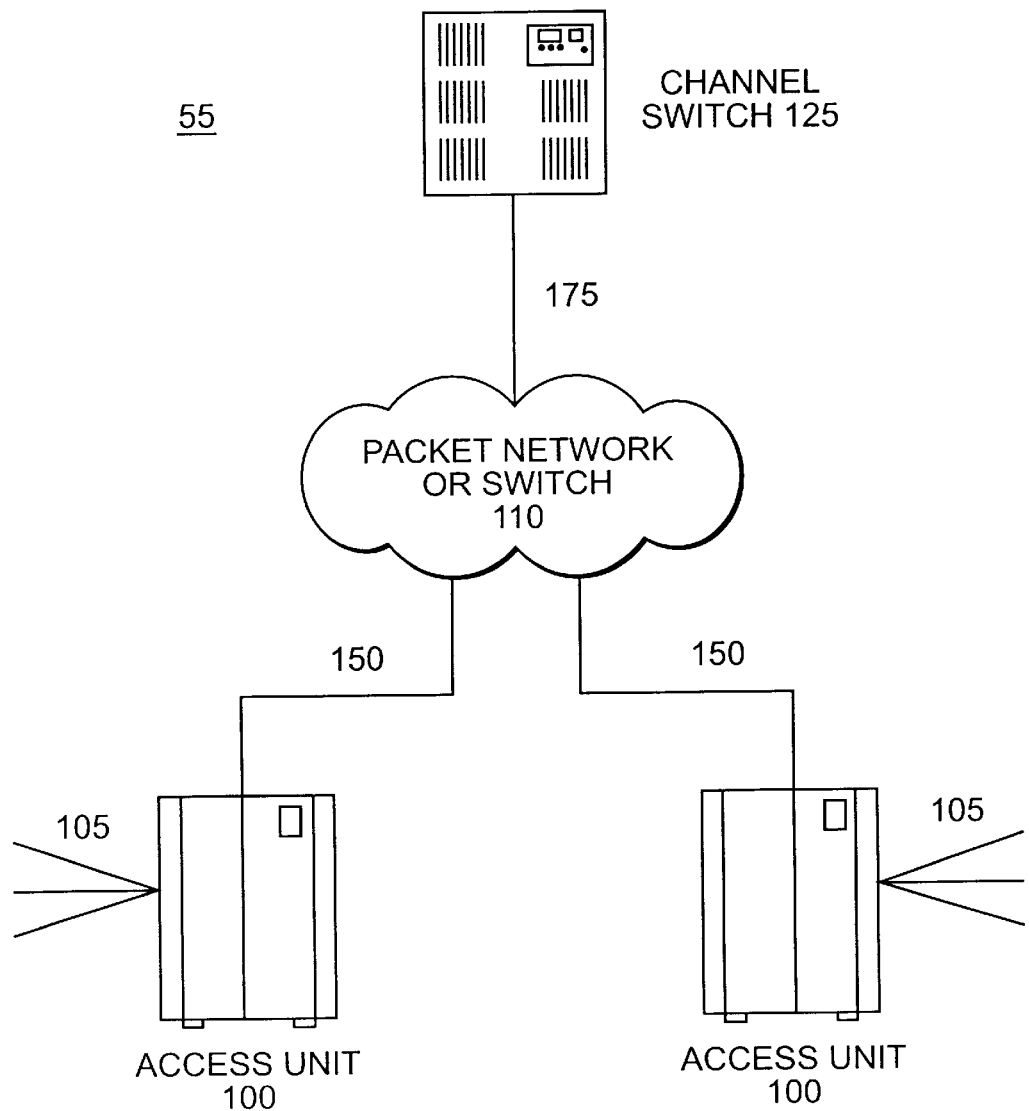
FIG. 2 shows another network consistent with this invention.

FIG. 2 shows network 55, a variation of network 50, in which channel switch 120 is a single channel switching unit 125. Channel switching unit 125 converts incoming packets received from packet switch 110 into outgoing packets. Although each incoming packet contains telephone call data from sources connected to a single access unit via lines or trunks 105, each outgoing packet contains telephone call data whose destinations connect to a single access unit 100. In a preferred embodiment, channel switching unit 125 converts incoming packets into outgoing packets by extracting telephone call data from packets and multiplexing the data into new packets that each contain data destined for the same access unit 100. This may be accomplished by a multiplexer and demultiplexer within channel switching unit 125. The multiplexing format used by switching unit 125 preferably corresponds to that used by access unit 100.

Figure 5:
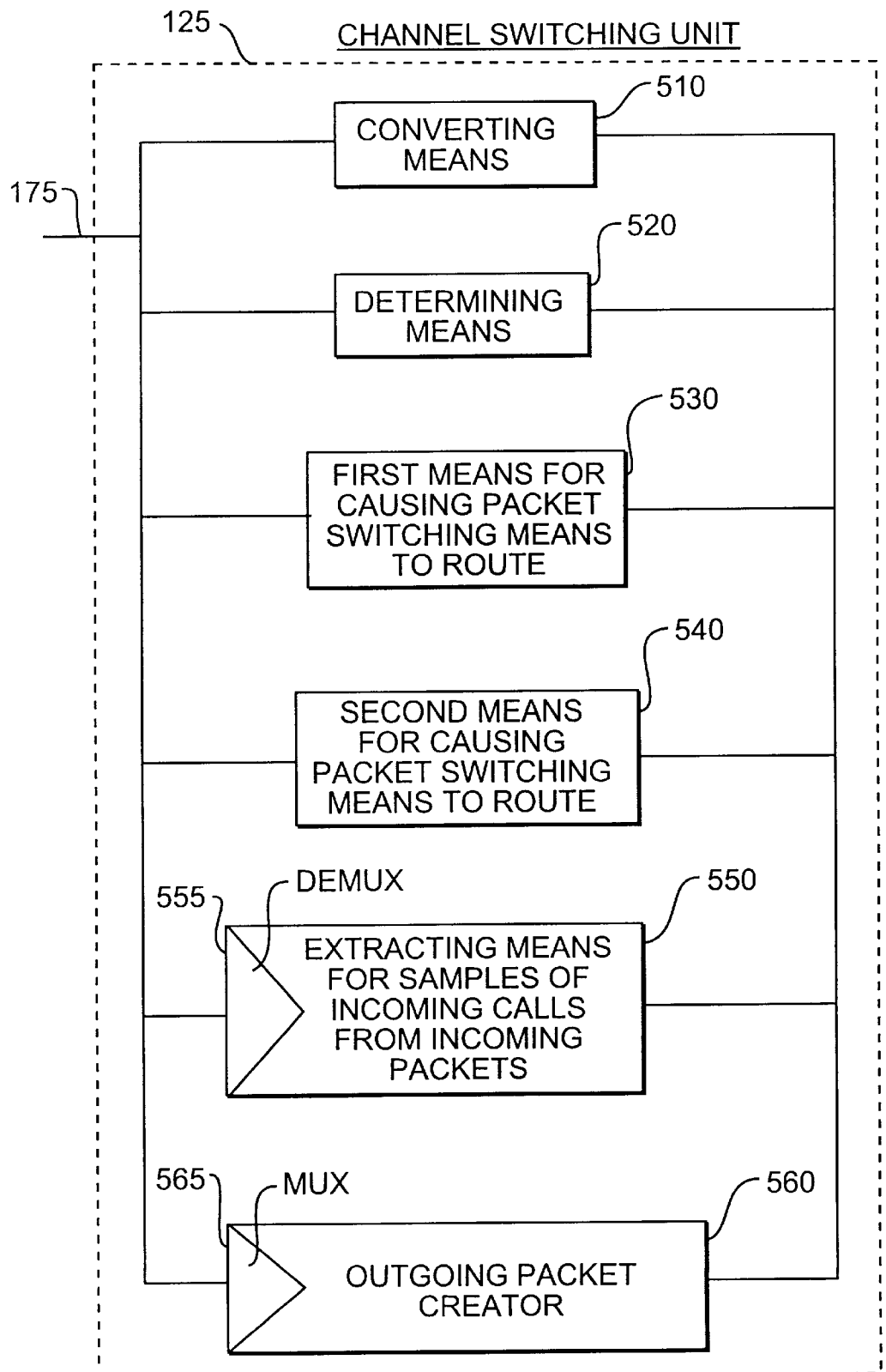
FIG. 5 shows a block diagram of an exemplary channel switching unit consistent with the present invention.

FIG. 5 shows a block diagram of an exemplary channel switching unit 125. Referring to FIG. 5, the channel switching unit 125 includes a means for converting 510 incoming packets from the assigned access unit means to outgoing packets and for converting incoming packets to intermediate packets; and means for determining 520 whether the destinations of each of the outgoing packets correspond to the ones of the access unit means assigned to that channel switching unit. Further, the channel switching unit 125 includes first means for causing 530, if the destinations of the outgoing packets correspond to the ones of the access unit means assigned to that channel switching unit, the packet switching means to route the outgoing packets to the ports of the packet switching means that couple to the ones of the destination access unit means assigned to that channel switching unit. Moreover, the channel switching unit 125 includes second means for causing 540, if the destinations of the outgoing packets do not correspond to the ones of the access unit means assigned to that channel switching unit, the packet switching means to route the outgoing packets to the ones of the channel switch ports that couple to the channel switching unit assigned to the destination access unit means for the outgoing packets. In addition, the channel switching unit 125 includes means for extracting 550 the samples of the incoming calls from the incoming packets, wherein the means for extracting 550 includes a demultiplexer 555. Further, the channel switching unit 125 includes means for creating 560 the outgoing packets to contain only samples of the calls that have destinations coupled to the same access unit means, wherein the means for creating 560 the outgoing packets includes a multiplexer 565.

Figure 6:
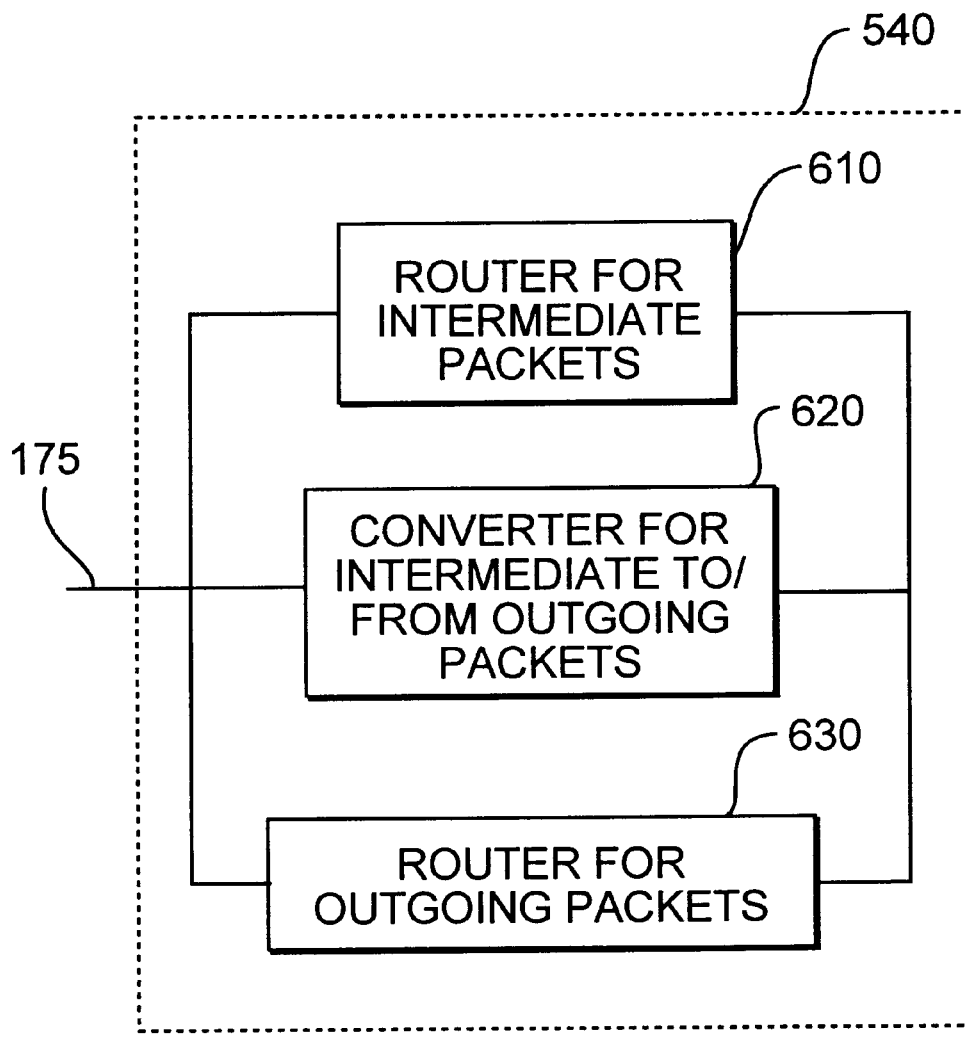
FIG. 6 shows a block diagram of an exemplary second means for causing packet switching means to route consistent with the present invention.

FIG. 6 shows a block diagram of an exemplary second means for causing 540 packet switching means to route consistent with the present invention. Referring to FIG. 6, the second means for causing 540 includes means for routing the intermediate packets 610 to the ports of the packet switching means that couple to a destination one of the channel switching units corresponding to the destination access unit. Furthermore, the second means for causing 540 includes means for converting 620 the intermediate packets to the outgoing packets; and means for routing 630 the outgoing packets to the ports of the packet switching means that couple to the destination access unit.

Figure 7:
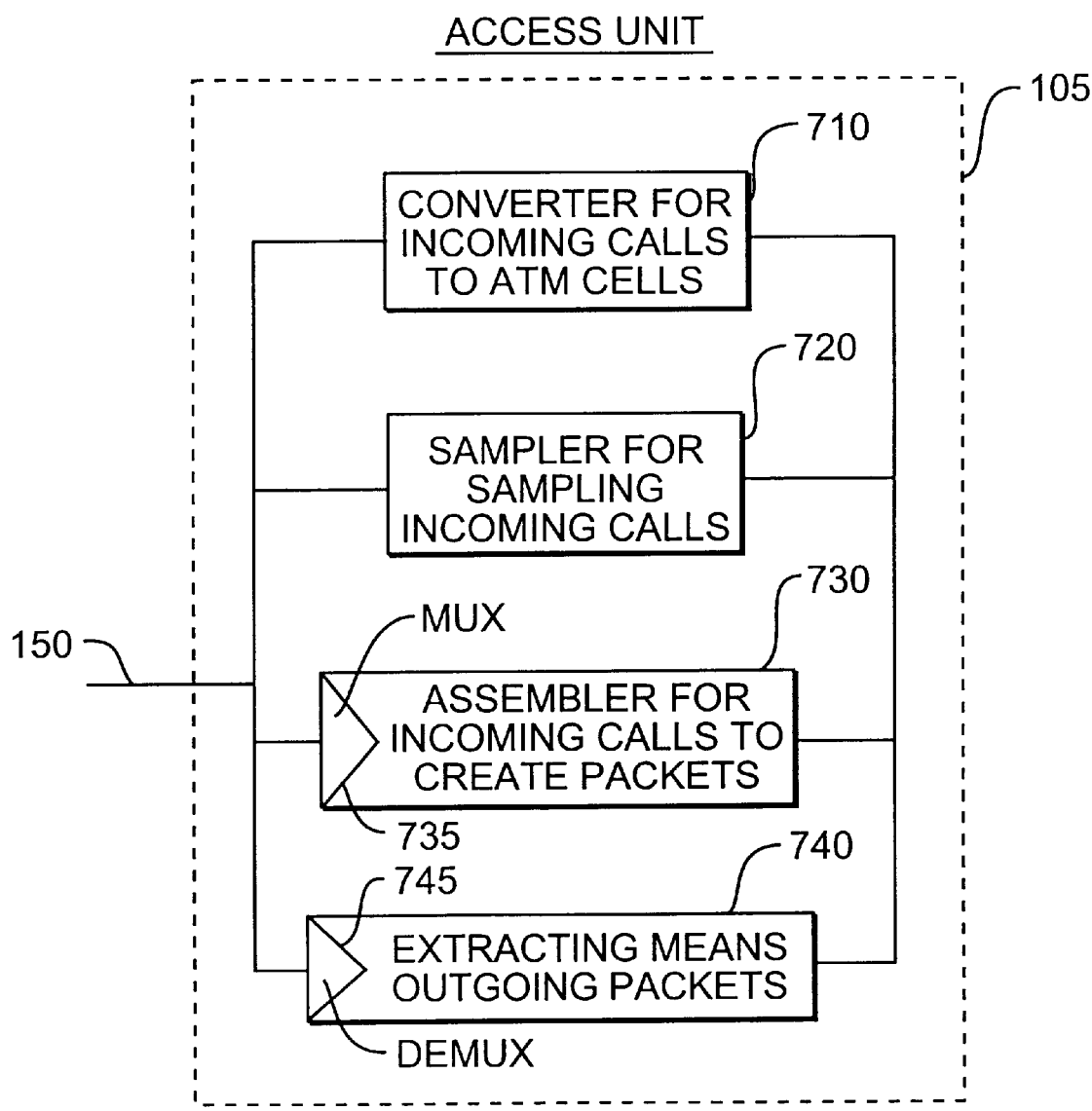
FIG. 7 shows a block diagram of an exemplary access unit consistent with the present invention.

FIG. 7 shows a block diagram of an exemplary access unit 105. Referring to FIG. 7, the access unit 105 includes, for example, means for converting 710 incoming calls to Asynchronous Transfer Mode (ATM) cells and means for sampling 720 the incoming calls. Further, the access unit 105 includes means for assembling 730 the samples of the incoming calls to create the incoming packets, wherein the means for assembling 730 includes a multiplexer 735. Moreover, the access unit 105 includes means for extracting 740 from the outgoing packets samples of the outgoing calls, wherein the means for extracting includes a demultiplexer 745.

Figure 3:
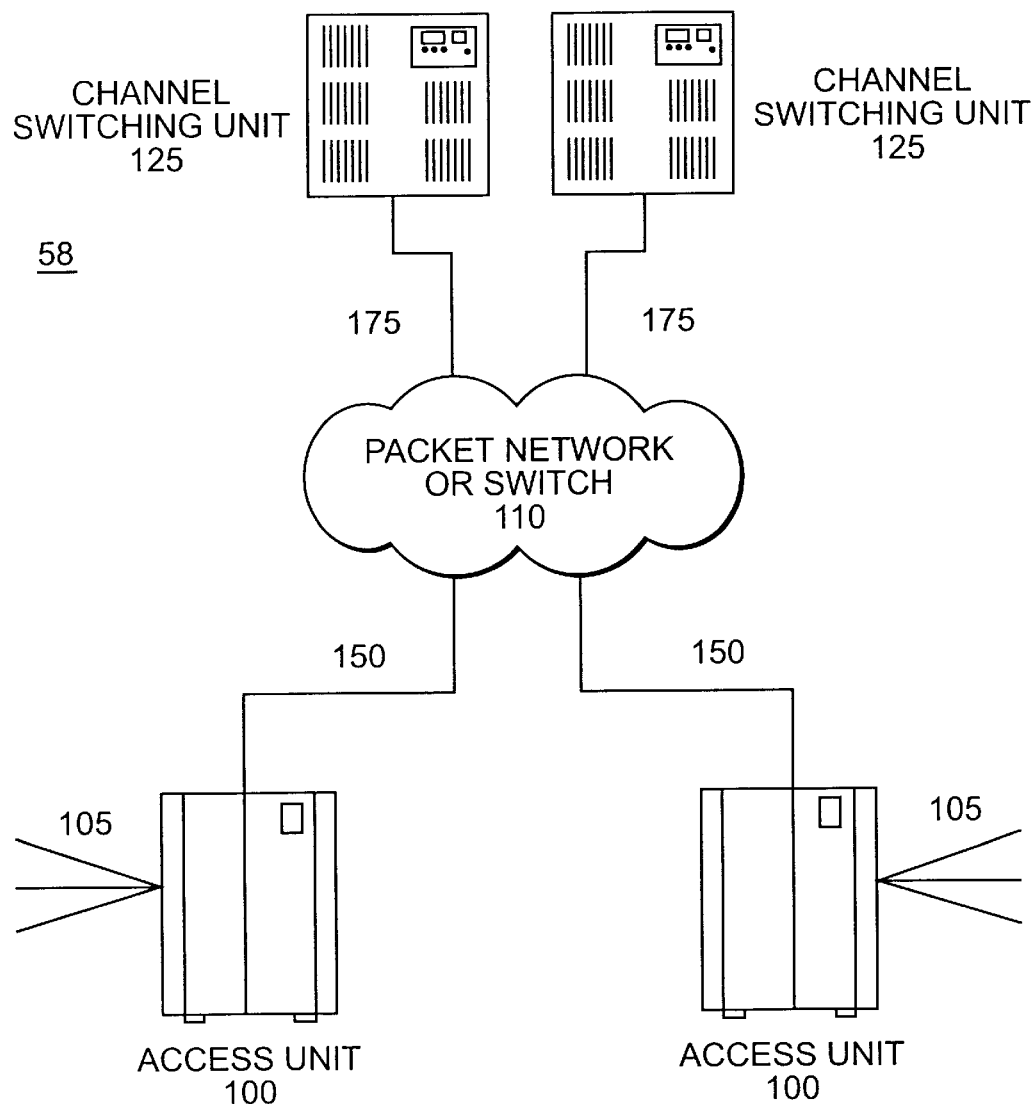
FIG. 3 shows another network consistent with this invention.

FIG. 3 shows network 58, a variation of network 55, with several channel switching units 125. Each access unit 100, however, is assigned to only one channel switching unit 125. Network 58 operates similarly to network 55, in one of two conditions. For telephone calls between a source and destination whose access units 100 are assigned to the same channel switching unit 125, that channel switching unit 125 functions as in FIG. 2. For telephone calls between a source and destination whose access units 100 are assigned to different channel switching units 125, channel switching units 125 must perform additional steps.

Specifically, packet switch 110 first creates a virtual channel between access unit 100 and the corresponding channel switching unit 125 to which it is assigned. Packet switch 110 then transports packets from access unit 100, over this virtual channel, to the corresponding channel switching unit 125 called, for purposes of simplification, the source channel switching unit 125.

When source channel switching unit 125 finds call data destined for an access unit 100 assigned to a different channel switching unit 125, called for purposes of simplicity, the destination channel switching unit 125, source switch unit 125 multiplexes the call data into an intermediate packet and sends the intermediate packet to destination switching unit 125 over a virtual channel in packet switch 110.

Next, outgoing channel switching unit 125 extracts call data from the intermediate packets and forms outgoing packets. Switch 120 transports the outgoing packets to the destination access unit 100 through a virtual channel in packet switch 110.

B. Network Design

For design purposes, the capacity and bandwidth of network 58 in FIG. 3 can be determined using the following assumptions: (1) all DS0 voice channels on each access unit 100 are assigned to one channel switching unit 125 for worst case routing between channel switching units 125, and (2) each channel switching unit 125 will have the same number of DS0 voice channels assigned to it. Under worst case assumptions, every DS0 voice channel coming into a channel switching unit 125 will need to be sent to another channel switching unit 125, so that $I_{max}=D_{max}$, where $I_{max}$ is the bandwidth dedicated on a link for communications between channel switching units 125, and $D_{max}$ is the number of DS0 voice channels assigned to each channel switching unit 125. The basic equation governing link bandwidth is:

$$B_{max} = I_{max} + D_{max} + (N-2)(T_{min} - 1), \quad (4)$$

where $B_{max}$ is the total bandwidth of links 175 (measured in terms of numbers of channels) between packet switch 110 and channel switching units 125. The last term in equation (4) represents the wasted bandwidth due to worst case routing.

$D_{max}$ and $T_{ch}$, the total number of DS0 voice channels supported by the system, can be calculated as:

$$D_{max} = \frac{1}{2}[B_{max} - (N-2)(T_{min} - 1)], \quad (5)$$

$$T_{ch} = \frac{N}{2}[B_{max} - (N-2)(T_{min} - 1)]. \quad (6)$$

The number of channel switching units 125 in the largest system, $N_{large}$, is:

$$N_{large} = 1 + \frac{B_{max}}{2(T_{min} - 1)} \quad (7)$$

To obtain a network design equation, one must solve equations (5) and (6) for N, which must be less than $N_{large}$, as follows:

$$N = \frac{(2T_{min} - 2 + B_{max}) - \sqrt{(2T_{min} - 2 + B_{max})^2 - 8(T_{min} - 1)T_{ch}}}{2(T_{min} - 1)} \quad (8)$$

The ATM bandwidth efficiency for the system under maximum load with worst case routing is therefore:

$$Efficiency = \frac{B_{max} - (N-2)(T_{min} - 1)}{B_{max}} \quad (9)$$

Equation (3) shows that for conventional networks, the number of access and switching units is limited by $L_{max}$, as well as the bandwidth of each access link between the access and switching units and the ATM switch. Therefore, whenever an access and switching unit is added to the network, more bandwidth is required on each of the access links already in place.

Equation (7), however, shows that for networks designed according to this invention, the total number of switching units is limited by $B_{max}$, as well as the total bandwidth of links 175 between channel switches 125 and packet switch 110. Additional access units can be added to the network as long as the number of channels assigned to the switching units 125 has not exceeded $D_{max}$. Therefore, in network 55, the number of access units 100, n, is not limited by the available bandwidth on links 150 between access units 100 and packet switch 110. On the other hand, the number of access and switching units in the conventional architecture is limited by the bandwidth available between the access and switching units and the packet switch.

The following example demonstrates the limiting effect of the conventional network architecture. Using the architecture of network 58 in FIG. 3, a network with four channel switching units 125 and sixty access units 100 could be configured such that each access unit 100 used an average of 200 DS0 voice channels. If each channel switching unit 125 is connected to the packet switch 110 via three STS-3c links, $B_{max}$, the bandwidth of each link 175, in terms of DS0 channels, will be approximately 6336. According to equation (6), where $T_{min}$ is 48, the total number of DS0 channels supported by the network will be 12,484. Configuring a network with sixty access and switching units using the conventional architecture would force $L_{max}$ to be greater than 5000, and the access link between each access and switching unit and the packet switch to include at least four STS-3cs, at over 600 Mbps. Such a network would be exorbitantly expensive and extremely overengineered.

C. Multiplexing Formats

Figure 4:
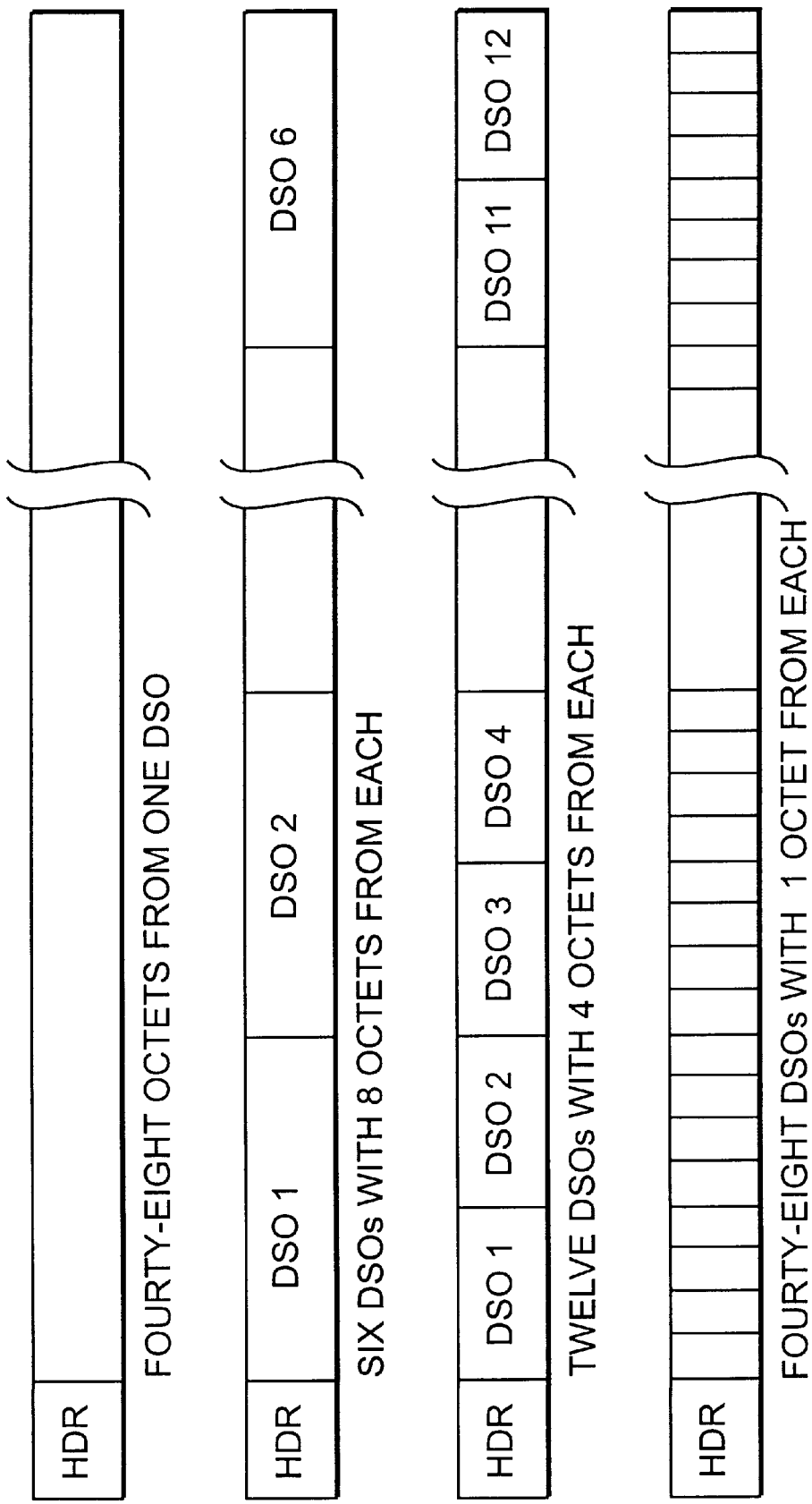
FIG. 4 shows examples of a multiplexing format consistent with this invention.

As explained above, the networks in FIGS. 1 through 3 can be used with conventional multiplexing. Another multiplexing format, however, provides tradeoffs between bandwidth efficiency and cell fill delay. FIG. 4 shows examples of this multiplex format along with an example of "single call per channel full cell fill," where the entire ATM cell is filled with 48 samples from one DS0 channel, resulting in a cell fill delay of 6 ms.

The multiplex formats accommodate data from M DS0s, where M is a divisor of 48. Each DS0 contributes 48/M bytes to a cell, and the position of those bytes is fixed within the cell for the duration of the DS0 connection. Thus, all 48 bytes of the ATM cell payload are used.

The ATM user-to-user bit in the ATM cell header is turned on and off with each successive cell. This can be used as a 1-bit sequence number and for frame alignment.

The following table shows the cell fill delay and the ATM bandwidth used by each format.

TABLE I

| Number of DSO's per Cell (N) | Number of bytes from each DSO | ATM bandwidth per VC | Delay in mSec |
|---|---|---|---|
| 1 | 48 | 70,667 | 6 |
| 2 | 24 | 141,333 | 3 |
| 3 | 16 | 212,000 | 2 |
| 4 | 12 | 282,667 | 1.5 |
| 6 | 8 | 424,000 | 1 |
| 8 | 6 | 565,333 | 0.75 |
| 12 | 4 | 848,000 | 0.5 |
| 16 | 3 | 1,130,667 | 0.375 |
| 24 | 2 | 1,696,000 | 0.25 |
| 48 | 1 | 3,392,000 | 0.125 |

The choice of multiplexing format would be indicated via the management system or in the signaling messages used to set up the ATM virtual channel. Information elements in the signaling messages indicate the AAL layer being used.

A family of multiplex formats allows trade-offs between cell fill delay and system efficiency. Fewer DS0s in a format (N, Table I), means a smaller Tmin. Tmin shows up in the efficiency equation (9) and in capacity equations (5)–(7). If the total delay becomes too large, echo cancellers may be needed, adding expense and complexity. Therefore, in planning a system, the cell fill delay of the voice-over-ATM (2) format is an important parameter in the overall delay budget and this family of voice-over-ATM formats allows one to trade off efficiency for cell fill delay.

D. Conclusion

It will be apparent to those skilled in the art that various modifications and variations can be made in the network and methods of the present invention without departing from the scope or spirit of the invention. Other embodiments of the invention will be apparent to those skilled in the art from consideration of the specification and practice of the invention. The specification and examples are only exemplary. The true scope and spirit of the invention is indicated by the following claims.

What is claimed is:

1. A telecommunications network for routing telephone calls from sources to destinations comprising:

a plurality of access unit means, coupled to the sources and destinations, for converting incoming calls from the sources into incoming packets, for reconstructing outgoing calls from outgoing packets, and for routing to the destinations the reconstructed outgoing calls, each of the access unit means acting as source access unit means when converting incoming calls and as destination access unit means when routing outgoing calls to the destinations;

packet switching means, coupled to the plurality of access unit means through input and output ports, for routing the incoming packets received from the source access unit means through the input ports to a channel switching port, and for routing the outgoing packets received from the channel switching port to the output ports coupled to the destination access unit means corresponding to the destinations of the outgoing packets; and channel switching means, coupled to the packet switching means through the channel switching port, for converting the incoming packets into the outgoing packets and for causing the packet switching means to route the outgoing packets to the ones of the output ports of the packet switching means that couple to the destination access unit means corresponding to the destinations of the outgoing packets, wherein said channel switching means is separated from said plurality of access unit means.

2. The telecommunications network of claim 1, wherein the channel switching means includes a single channel switching unit.

3. The telecommunications network of claim 1, wherein the channel switching means includes a plurality of separate channel switching units; and wherein each of the access unit means is assigned to one of the channel switching units.

4. The telecommunications network of claim 3, wherein the packet switching means includes a separate channel switch port for each channel switching unit; and wherein each of the channel switching units includes means for converting incoming packets from the assigned access unit means to outgoing packets;

means for determining whether the destinations of each of the outgoing packets correspond to the ones of the access unit means assigned to that channel switching unit;

first means for causing, if the destinations of the outgoing packets correspond to the ones of the access unit means assigned to that channel switching unit, the packet switching means to route the outgoing packets to the ports of the packet switching means that couple to the ones of the destination access unit means assigned to that channel switching unit; and second means for causing, if the destinations of the outgoing packets do not correspond to the ones of the access unit means assigned to that channel switching unit, the packet switching means to route the outgoing packets to the ones of the channel switch ports that couple to the channel switching unit assigned to the destination access unit means for the outgoing packets.

5. The telecommunications network of claim 4, wherein each of the channel switching units includes:

means for converting incoming packets to intermediate packets; and wherein the second means for causing includes means for routing the intermediate packets to the ports of the packet switching means that couple to a destination one of the channel switching units corresponding to the destination access unit;

means for converting the intermediate packets to the outgoing packets; and means for routing the outgoing packets to the ports of the packet switching means that couple to the destination access unit.

6. The telecommunications network of claim 3, wherein the access unit means are coupled to the input and output ports of the packet switching means by access trunks carrying access channels;

wherein the switching units are coupled to the switch ports of the packet switching means by switch trunks carrying switch channels;

wherein the number of channel switching units is $$N = \frac{(2T_{min} - 2 + B_{max}) - \sqrt{(2T_{min} - 2 + B_{max})^2 - 8(T_{min} - 1)T_{ch}}}{2(T_{min} - 1)},$$

where $T_{min}$ is the minimum number of access channels carried by one of the access trunks, $B_{max}$ is the maximum number of switch channels carried by one of the switch trunks, and $T_{ch}$ is the total number of access channels in the network; and wherein the maximum number of access channels carried on access trunks corresponding to access unit means assigned to a channel switching unit is $$D_{max} = \frac{1}{2}[B_{max} - (N - 2)(T_{min} - 1)].$$

7. The telecommunications network of claim 1, wherein the plurality of access unit means for converting incoming calls to incoming packets includes means for converting incoming calls to Asynchronous Transfer Mode (ATM) cells.

8. The telecommunications network of claim 1, wherein the packet switching means includes an ATM switch.

9. The telecommunications network of claim 1, wherein the packet switching means includes an ATM network.

10. The telecommunications network of claim 1, wherein the access unit means includes means for sampling the incoming calls, and means for assembling the samples of the incoming calls to create the incoming packets; and means for extracting from the outgoing packets samples of the outgoing calls.

11. The telecommunications network of claim 10, wherein the means for assembling the samples of the incoming calls includes a multiplexer; and wherein the means for extracting the samples of the outgoing calls includes a demultiplexer.

12. The telecommunications network of claim 10, wherein the channel switching means includes
   means for extracting the samples of the incoming calls from the incoming packets; and
   means for creating the outgoing packets to contain only samples of the calls that have destinations coupled to the same access unit means.

13. The telecommunications network of claim 12, wherein the means for extracting the samples includes a demultiplexer; and
   wherein the means for creating the outgoing packets includes a multiplexer.

14. A method for routing telephone calls in a telecommunications network from sources to destinations comprising the steps of:
   converting at a plurality of access units incoming telephone calls from the sources into incoming packets;
   receiving at ports of a packet switch the incoming packets from the access units;
   routing the incoming packets to a channel port coupled to a channel switching unit;
   converting the incoming packets received at the channel switching unit into outgoing packets, wherein said channel switching means is separated from said plurality of access unit means;
   routing the outgoing packets to the ports of the packet switch that couple into the appropriate access units;
   converting the outgoing packets received at the plurality of access units into outgoing calls; and
   routing the outgoing calls to the destinations.

15. The method as recited in claim 14, further including the steps of
   determining a number, M, of DS0 channels, where M is a divisor of 48; placing 48/M samples from each DS0 voice channel into the cell in a contiguous field, wherein each of the 48/M samples has a fixed filed location; and setting an indication in the header of the cell to indicate a packing of the DS0 voice channels.

16. A method for configuring a telecommunications network having access units, channel switching units, and a packet switching means, comprising the steps of:
   determining a number of channel switching units, N, as:

$$N = \frac{(2T_{min} - 2 + B_{max}) - \sqrt{(2T_{min} - 2 + B_{max})^2 - 8(T_{min} - 1)T_{ch}}}{2(T_{min} - 1)},$$

where $T_{min}$ is the minimum number of channels between each of the access units and the packet switching means, $B_{max}$ is the channel capacity of the channel switching unit, and $T_{ch}$ is the total number of channels in the network;
   determining the maximum number of channels for each channel switching unit, $D_{max}$, as:

$$D_{max} = \frac{1}{2}[B_{max} - (N-2)(T_{min} - 1),$$

coupling the access units and the channel switching units to a packet switching means; and
   assigning each of the access units to one of the channel switching units such that none of the channel switching units has more than the maximum number of channels, $D_{max}$.

* * * * *